(12) United States Patent
Filev

(10) Patent No.: US 8,082,308 B1
(45) Date of Patent: Dec. 20, 2011

(54) ONLINE COLLABORATION AND PLANNING SYSTEM TRANSPARENTLY INTEGRATED WITH E-MAIL

(76) Inventor: Andrey Filev, Palo Alto, CA (US)

( * ) Notice: Subject to any disclaimer, the term of this patent is extended or adjusted under 35 U.S.C. 154(b) by 424 days.

(21) Appl. No.: 11/943,429

(22) Filed: Nov. 20, 2007

Related U.S. Application Data

(60) Provisional application No. 60/868,442, filed on Dec. 4, 2006.

(51) Int. Cl.
*G06F 15/16* (2006.01)
*G06F 7/00* (2006.01)
*G06F 9/46* (2006.01)

(52) U.S. Cl. ........ 709/206; 709/204; 709/205; 709/218; 718/100; 707/608

(58) Field of Classification Search .......... 709/204–206, 709/218; 718/100; 707/608
See application file for complete search history.

(56) References Cited

U.S. PATENT DOCUMENTS

| | | | |
|---|---|---|---|
| 6,539,404 B1 * | 3/2003 | Ouchi | 715/205 |
| 7,296,058 B2 * | 11/2007 | Throop | 709/206 |
| 7,546,346 B2 * | 6/2009 | Ouchi | 709/206 |
| 2002/0147789 A1 * | 10/2002 | Higbee et al. | 709/217 |
| 2004/0230658 A1 * | 11/2004 | Estrada et al. | 709/206 |
| 2006/0020670 A1 * | 1/2006 | Anderson | 709/206 |
| 2006/0143613 A1 * | 6/2006 | Lippe et al. | 718/100 |
| 2007/0179953 A1 * | 8/2007 | Mahoney et al. | 707/9 |
| 2007/0282660 A1 * | 12/2007 | Forth | 705/9 |

* cited by examiner

*Primary Examiner* — Ashok Patel
*Assistant Examiner* — Linglan Edwards
(74) *Attorney, Agent, or Firm* — Bardmesser Law Group

(57) ABSTRACT

A method, system and computer program product for managing tasks, including receiving an e-mail from a user, the e-mail including a subject line and at least one recipient, wherein the recipient is or is not registered in a task management system; parsing the e-mail to identify a task; adding the task to a task database of the task management system; adding the sender and recipient to a database of the task management system if needed. A web interface is provided for the sender and the recipient to interface with the task management system. The e-mail can be sent to multiple recipients and some of the recipients might not be registered with the task management system. The subject line of the e-mail is parsed for the task identification like name of the task. The subject line of the e-mail is also parsed for a due date and the due date is added to task parameters. The subject line of the e-mail is also parsed for groups in which the task should be included. The user has the highest level of privileges for setting parameters for the task. The e-mail is also parsed for body and attachments, which are used to populate a task's description properties and task attachments.

18 Claims, 16 Drawing Sheets

ONLINE COLLABORATION AND PLANNING SYSTEM TRANSPARENTLY INTEGRATED WITH E-MAIL

CROSS-REFERENCE TO RELATED APPLICATIONS

This patent application is a Non-Provisional of U.S. Provisional Patent Application No. 60/868,442; Filed: Dec. 4, 2006, entitled: ONLINE COLLABORATION AND PLANNING SYSTEM TRANSPARENTLY INTEGRATED WITH E-MAIL, which is incorporated by reference herein in its entirety.

BACKGROUND OF THE INVENTION

1. Field of the Invention

The present invention relates generally to online collaboration, and more particularly, to an online sharing, tracking and collaboration system that is transparently integrated with system e-mail and does not require prior registration from users.

2. Description of the Prior Art

A number of task management systems are known in the conventional art. For example, Microsoft Outlook allows a user to send invitations or tasks to other users. Other systems essentially replicate the concept of Microsoft Outlook in an online form, where a server presents web pages to registered users, and those registered users can then perform various activities relating to the tasks.

However, one of the common problems is that for an individual user to assign a task to another user, that user must already be a user of the system. For example, in the case of Microsoft Outlook, unless all of the people to whom the tasks are assigned are users of the same e-mail system, assigning and tracking of the tasks to users outside of the e-mail system is impossible.

A number of online collaboration systems are known in the conventional art. For example, Google Docs allows users to edit documents collaboratively online. However, one of the common problems is that for an individual to share Google document with another individual, he must do it from the Google Docs system. An individual cannot simply share a document in Google Docs by sending an e-mail to someone from Outlook Express. As another example, Basecamp (www.basecamphq.com) allows users collaborating on same documents or projects, but the user is asked to create a new collaboration workspace for all new projects. The users receive a notification e-mail if new projects are added or if some changes are made in the existing projects, but the users need to login into their account to work with the projects.

Another problem with prior art collaborative systems is that they do not allow using the specific e-mail address for sharing documents or projects with other users. For example, Backpack (www.backpackit.com) allows user to share some information with others by using e-mails, but the user needs to create a new online page with notes, to-do lists, or files using the web interface of the system, and then the system generates a unique e-mail address for that specific page. After that the user can share or update the page by using the e-mail, but the user needs to remember the unique e-mail addresses for all pages that he created. If the user confuses the e-mail address and sends e-mail with some information to the wrong system e-mail address, a wrong page will be updated.

A number of online social networks are also known in the conventional art. For example, LinkedIn allows professionals to log into a web-site and manage their personal connections to other registered users. However, they cannot simply send an e-mail to someone from any e-mail client and activate an invitation from LinkedIn system by this e-mail.

Accordingly, there is a need in the art for a system and method for a more effective online collaboration.

SUMMARY OF THE INVENTION

The present invention is directed to a more convenient way of sharing and task management. The present invention includes such exemplary operations as setting up tasks and managing tasks; collaboration on documents, web pages, wiki pages, pictures, videos, etc.

The present invention is directed to an online collaboration system that substantially obviates one or more of the problems and disadvantages of the related art. The particular examples used in this discussion address sharing and collaborative planning, managing and tracking tasks, although the invention is not limited to these applications. The invention is applicable to other forms of online collaboration and/or online social networking.

The invention allows users to turn e-mail in well-organized entities (tasks, documents, etc.). A user can send an e-mail from any e-mail software, even from online e-mail services like Microsoft Hotmail or mobile services like BlackBerry. The resulting approach makes the system easy to use for people familiar with e-mail and accessible from many locations. By simply adding a system's e-mail address user is able to instantly grow his social network, share information, assign tasks, and instantly create collaboration workspaces privately accessible to him and recipients of the e-mail. Note that the system e-mail address needs not be specifically generated for some particular entity, previously created in the system by user. This e-mail address does not vary from user to user or from entity to entity within a particular type of entity (in contrast with Backpack). There can be one system e-mail address that serves the whole system, or there can be different system e-mail addresses for different types of entities. When the system receives an e-mail sent to system address(es), the system will parse the e-mail in various ways, as described below, and will then generate a new entity. The system will give access to this new entity to a subset of users of the system, based on the e-mail's fields "from" (sender), "to" and "cc" (receivers).

The invention allows a person to send e-mail to the system, and based on the recipients of this e-mail, the system will create a new collaboration workspace for a sender and recipients. The system will also instantly register person and recipients in the system, if needed. All of these processes may include additional steps, such as validating a new user or getting a confirmation from him.

In one embodiment, the invention includes a method, system and computer program product for managing tasks, including receiving an e-mail from a user, the e-mail including a subject line and at least one recipient, wherein the recipient is or is not registered in a task management system; parsing the e-mail to identify a task; adding the task to a task database of the task management system; adding the sender and recipient to a database of the task management system if needed. A web interface is provided for the sender and the recipient to interface with the task management system. The e-mail can be sent to multiple recipients and some of the recipients might not be registered with the task management system. The subject line of the e-mail is parsed for the task identification like name of the task. The subject line of the e-mail is also parsed for a due date and the due date is added to task parameters. The subject line of the e-mail is also parsed for groups in which the task should be included. The user has the highest level of privileges for setting parameters for the task. The e-mail is also parsed for body and attachments, which are used to populate task's description properties and task attachments.

In another aspect, there is provided a method, system and computer program product for online collaboration and entities sharing, including a server-based collaboration system providing an interface for multiple users to work on a common document; an e-mail server interfacing to a network and to the server-based collaboration system, the e-mail server receiving and sending e-mails through the network; a users database maintaining a list of users and their properties; and a module for identifying new recipients in the received e-mails, and for adding the new recipients to the users database. The system creates the new document (or a page, or a set of pages) based on an e-mail sent to general system e-mail address from any e-mail client and gives the sender and recipient/s of the e-mail web interfaces to see and/or change the document (or the page, or the set of pages).

Additional features and advantages of the invention will be set forth in the description that follows. Yet further features and advantages will be apparent to a person skilled in the art based on the description set forth herein or can be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the figures:

FIG. 4C illustrates exemplary relationship among fields of an e-mail send to the system and a new task created in the system.

FIGS. 5A-7B illustrate screenshots of an exemplary appearance that users see, as part of their web and e-mail interfaces during interactions with the system.

DETAILED DESCRIPTION OF THE INVENTION

Figure 1:
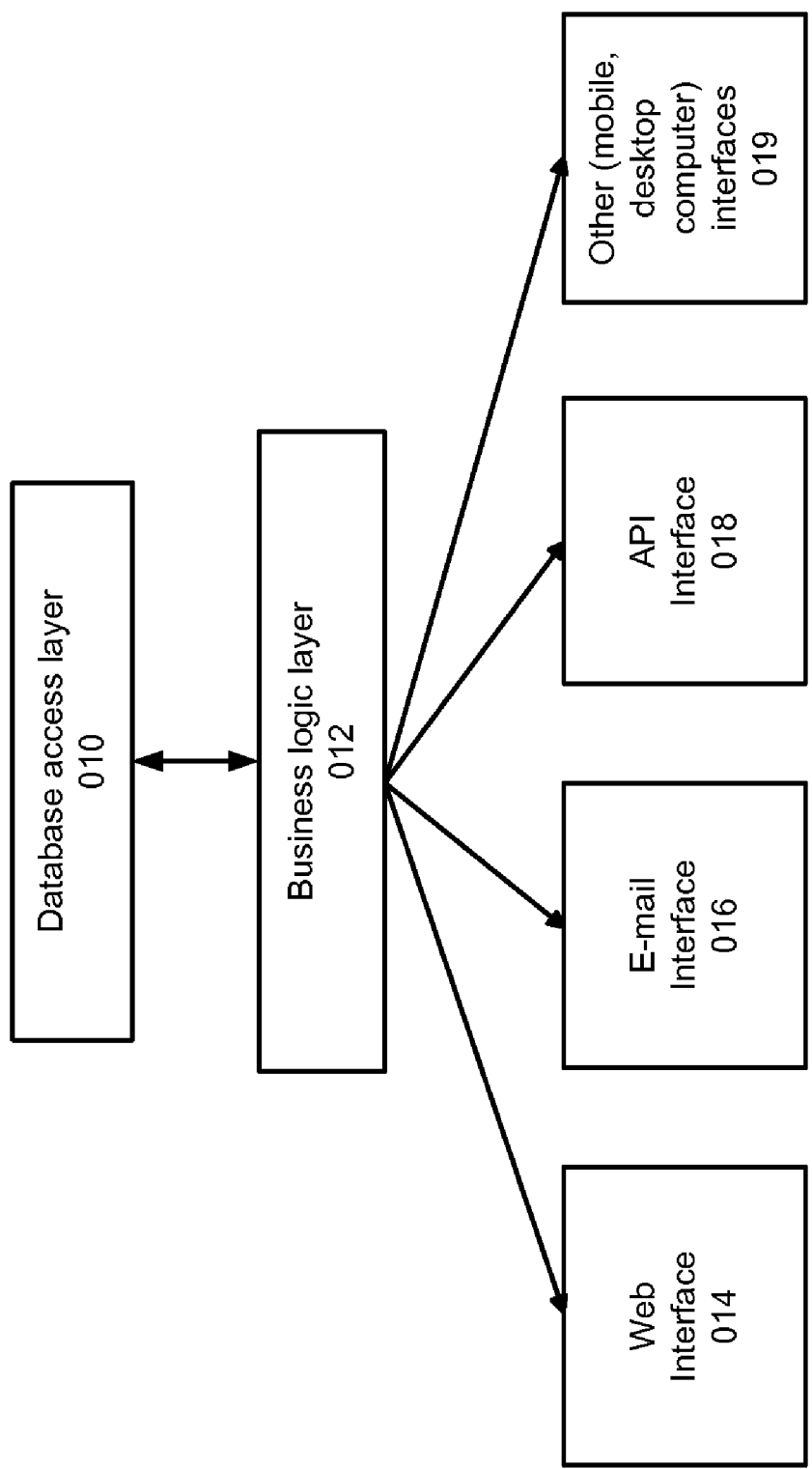
FIG. 1 illustrates exemplary logical view of the system architecture.

Reference will now be made in detail to the embodiments of the present invention, examples of which are illustrated in the accompanying drawings.

The present invention is directed to a more convenient way of sharing entities and task management. The present invention includes such operation as setting up tasks and managing tasks, collaboration on documents, web pages, wiki pages, pictures, videos, etc.

In this application, the term WRIKE (www.wrike.com) is used as an example of online collaboration system, although it is understood that the word is a "made-up" word, for marketing purposes. This system has a special e-mail address wrike@wrike.com that helps users to create entities and collaborate on those entities.

In one particular example, a user sends an e-mail to one or more recipients directing them to undertake a task. He includes a special e-mail address (in this example, wrike@wrike.com) in "cc" field. In this example, the system receives this e-mail, parses it in various ways, as described below, and then generates a new task based on the e-mail content. If the sender (a user, whose e-mail address was in "from" field of the e-mail sent to the system) and/or a particular recipient (a user, whose e-mail address was in "to", "cc", or "bcc" field of the e-mail sent to the system) is not yet a user of the WRIKE system, then the WRIKE system will register all new users automatically and send them e-mail notification, providing a link to a webpage where the new users can log in.

The system adds the task to an entity database and gives sender and recipient/s of the e-mail an access to the task. The system also makes sure that the various settings of the sender and recipient are appropriate, relative to the privileges that the users have (for example, create a task, delete a task, complete a task, modify a task, etc.). If one of these users will change the task later, the others will see changes and will be notified about those changes. These changes might be general and applicable to entities of other types. For example, user may change task name, delete the task, etc. These changes might also be specific for a particular entity type. For example, in case of tasks, they may be completed, rescheduled, etc.

In another particular example, a user sends an e-mail to one or more recipients to share with them some document (in Word format in this particular example). He includes a special e-mail address (in this example, wrike@wrike.com) in "cc" field. In this example, the system receives this e-mail, parses it in various ways, as described below, and then generates a new online-document based on the e-mail content. If the sender and/or a particular recipient is not yet a user of the WRIKE system, then the WRIKE system will register all new users automatically and send them e-mail notification, providing a link to a webpage where the new users can log in. The system adds the online-document to an entity database and gives sender and recipient/s of the e-mail an access to the document.

The system also makes sure that the various settings of the sender and recipient are appropriate, relative to the privileges that the users have (for example, read a document, modify a document, delete a document, etc.). If one of these users changes the online-document later, the others will see changes and will be notified about those changes. These changes might be general and applicable to entities of other types. For example, user may change document name, delete the document, etc. These changes might also be specific for a particular entity type. For example, in case of online-document, they may be edited, formatted, etc.

As another particular example, a user sends an e-mail with booking confirmation to a system e-mail address (in this example, wrike@wrike.com) to create a new travel itinerary. In this example, the system receives this e-mail, parses it as described below, extracts semantic information and then generates a new online itinerary for the sender. As in examples with tasks and online-documents, this itinerary can become shared with other users if the sender of the e-mail adds other users e-mail addresses in the recipients' field of the e-mail.

As a generalization of previous examples, consider a situation where a user is writing an e-mail to one or more recipients to share some information with them (task, document, etc.). Recipients' e-mail address list can include the sender's e-mail address. The list may even be empty. By adding an e-mail address of the system to the list of recipients (whether in the "to" field, or in the "cc" field, or in the "bcc" field), this e-mail will result in the generation of a new entity (a task, an itinerary, an online-document, a picture, a video, etc.) in the system, and various attributes associated with a new entity.

Note that the e-mail address needs not be specifically generated for some particular entity, previously created in the system by a user. This e-mail address need not vary from user to user or from entity to entity within a particular type of entity. There can be one system e-mail address that serves the whole system. We will use wrike@wrike.com as an example of one realization of embodiments of the present invention. However, there can be different system e-mail addresses for different types of entities. As an example, task@wrike.com can create a task; spreadsheetwrike.com can create a spreadsheet; text@wrike.com can create a text document, etc. Though, of course, WRIKE could generate an e-mail address for a particular user or workspace, i.e., if the approach works in a more general case, it works in a more specific case as well.

When the system receives an e-mail sent to system address (es), system will parse the e-mail in various ways, as described below, and will then generate a new entity. The system will give access to this new entity to a subset of users of the system, based on the e-mail's fields "from" (sender), "to" and "cc" (receivers). Note that different recipients/senders combinations in e-mails may create entities with different access rights to corresponding entities. Access rights may vary depending on whether the persons e-mail address was included in the "from", "to", "cc" or "bcc" fields of the e-mail. In most cases, recipients included in "bcc" field will not be visible for the system. However, there might be scenarios when the system has access to this field. One example is a case when the system is integrated with the sender's e-mail software.

Optionally, all of the recipients of the e-mail are added to the sender's social network in the WRIKE online system.

All of this is convenient for the user. He may send this e-mail from any e-mail software, even from online e-mail services like Microsoft Hotmail or mobile services like BlackBerry. The resulting invention makes the system very easy to use for people familiar with e-mail and accessible from a lot of locations. By simply adding the system's e-mail address (wrike@wrike.com in this example) the user is able to instantly grow his social network, share information, assign tasks, and instantly create collaboration workspaces privately accessible to him and recipients of the e-mail.

FIG. 1 illustrates a particular example of logical view of system's architecture. Software is divided into several layers. The database access layer 010 is responsible for communicating with database. The business logic 012 consists of software that helps to manipulate data and perform different actions. There are packages related to handling domain model, security, web and e-mail notifications, user settings, user relations and utilitarian function in the business logic 012. The business logic has several interfaces to communicate with other systems and/or users: web interface 014, e-mail interface 016, API interface 018, and other interfaces (such as mobile, desktop computer, etc.) 019. E-mail interface 016 helps the system send and receive e-mails. It should be noted that this is only an exemplary embodiment of the invention, and in other embodiments, layering and other technical architecture decisions might be made differently.

Figure 2:
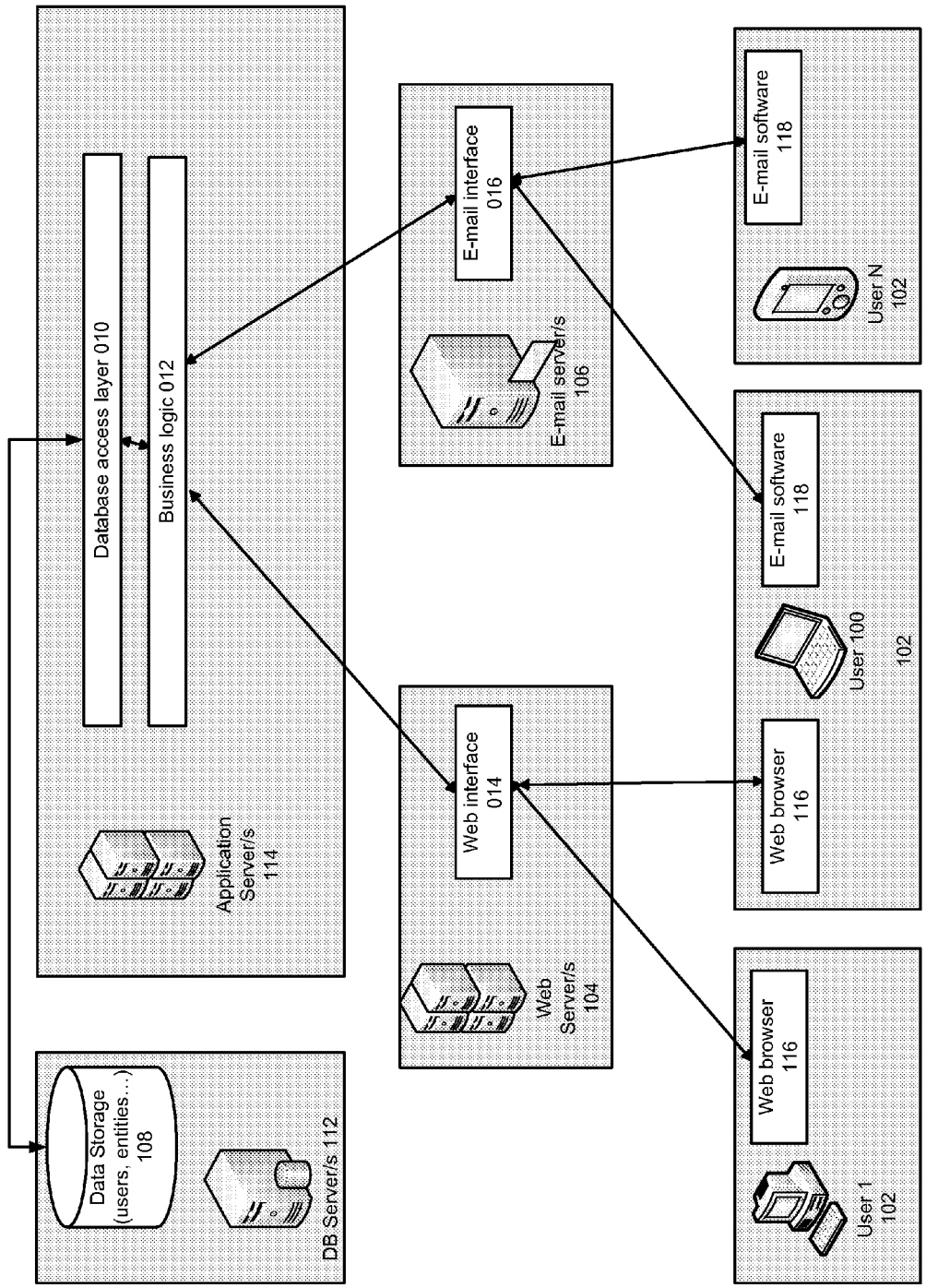
FIG. 2 illustrates exemplary physical view of the system architecture of the invention.

FIG. 2 shows a particular example of physical view of system's architecture. The database server/s 112 hosts the database/s 108 (storage/s with objects representing users, documents, revisions, statistics, files, etc., which may be separate databases, or a single database as shown in FIG. 2).

The database is interfaced to a database access layer 010. The database access layer 010 interfaces to the server-side business logic 012. These two components in this particular example are hosted on the application server/s 114.

A number of users 102 have access to the Internet or other networks, such as wired networks, LANs, WANs, wireless networks, etc. For simplicity, these networks will be referred to as the Internet in this patent application. These users can connect to the Internet through virtually any of the current devices that support e-mail and/or web browsing, such as desktops, laptops, PDAs, phones, game and set-top boxes, etc. Users 102 may connect to the WRIKE system through web browser 116 or e-mail software 118. Web interface module 014 interacts with web browser 116. E-mail interface module 016 interacts with e-mail software 118.

It should be noted that user may or may not have both e-mail software and web browser. Web interface module 014 and e-mail interface module 016 interact with the server-side business logic 012. The server side business logic 012 includes the user manager, the entity manager, and the various other packages. In case of WRIKE business logic 012 is deployed as J2EE application on the application server software named JBoss that is physically located on the application servers 114. The application servers 114 are connected through the network with web servers 104 and e-mail servers 106.

In another possible configuration some of the logical view components might be hosted on one physical server. The e-mail server 106 can support an SMTP, POP3 and other protocols for sending and receiving e-mails. Other protocols, such as IMAP, can be supported as well, and the invention is not limited to any particular e-mail protocol. All hardware elements described above are not particularly limited to any one configuration. For example, single servers, virtual servers, server clusters, etc. can be used for any of the servers, such as the database server 112, the application server 114, the e-mail server 106, web server 104, etc. Also, the system can be distributed physically and geographically, if it is necessary. Other configurations are also possible to implement the embodiment of the invention. For example, e-mails might be processed on the user computer and such building blocks might be connected to each other using peer to peer protocols.

Figure 3:
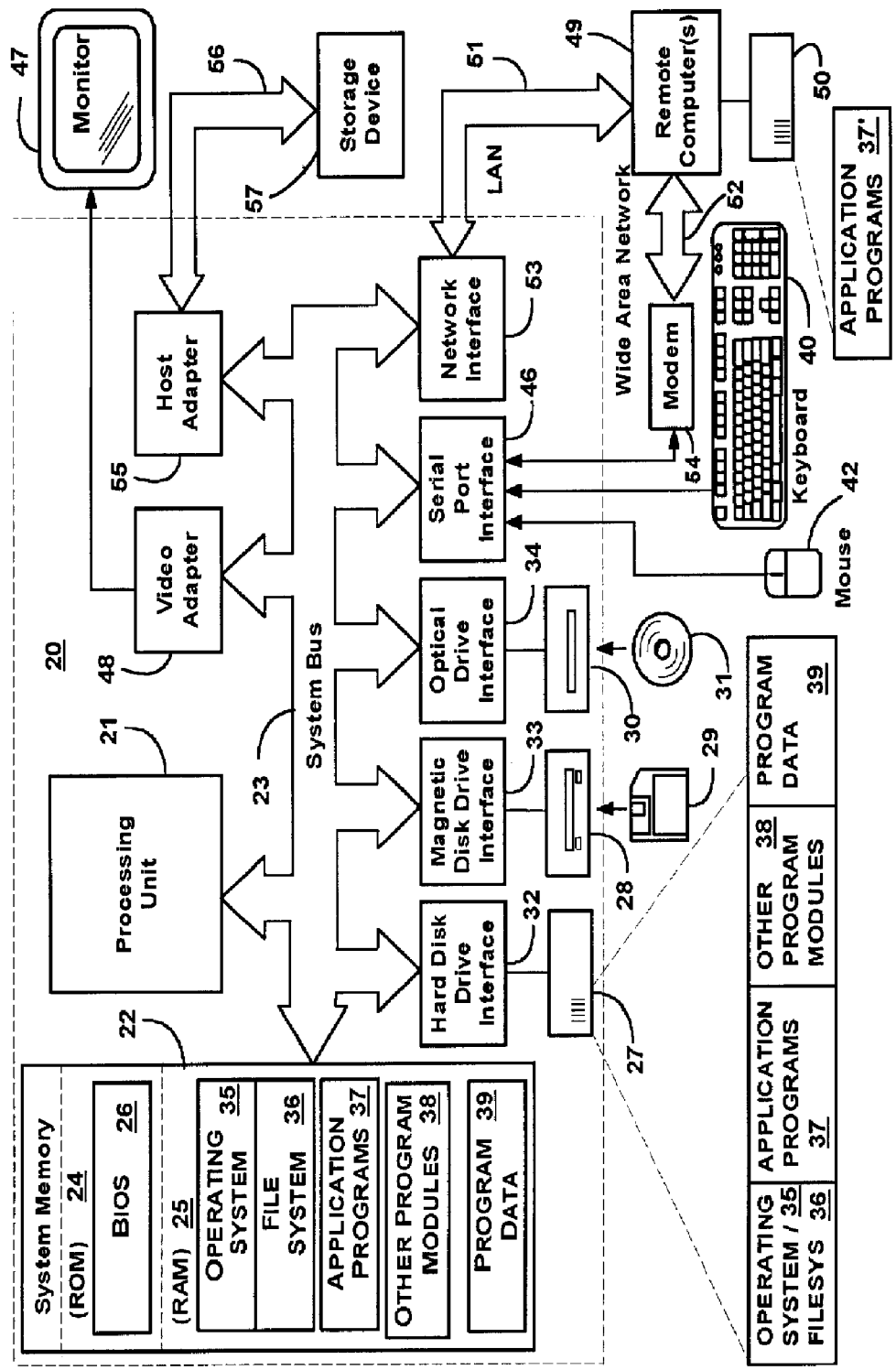
FIG. 3 illustrates an exemplary computer, such as a server or a client computer, on which the invention may be implemented.

With reference to FIG. 3, an exemplary computer system, where the invention can be implemented, includes a general purpose computing device in the form of a user-side computer and/or server-side computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures.

The system memory includes read-only memory (ROM) 24 and random access memory (RAM) 25. A basic input/output system 26 (BIOS), containing the basic routines that help to transfer information between elements within the computer 20, such as during start-up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (e.g., Windows™ 2000). The computer 20 includes a file system 36 associated with or included within the operating system 35, such as the Windows NT™ File System (NTFS), one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Figure 4A:
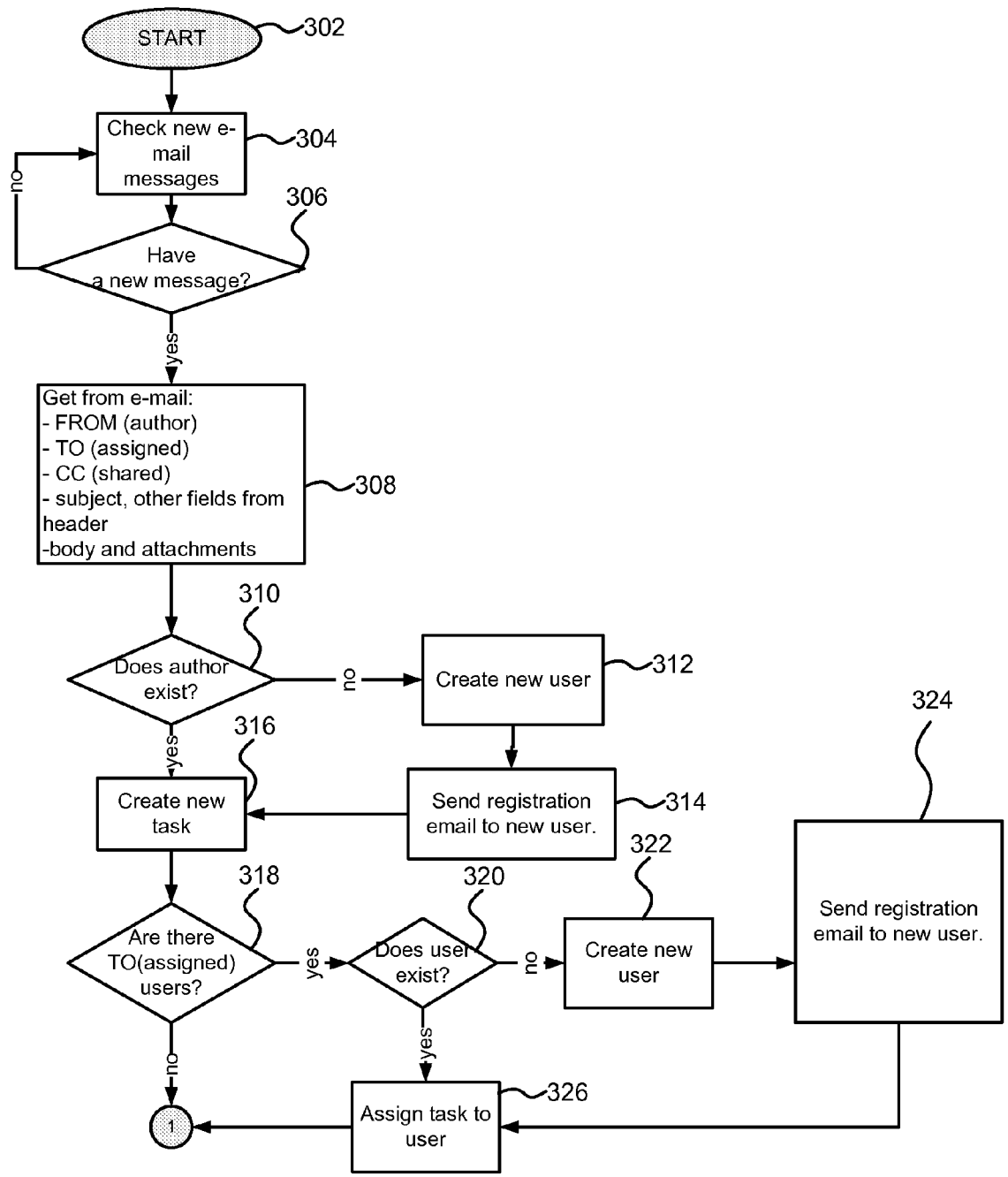
FIGS. 4A and 4B illustrate an exemplary algorithm of one embodiment of the invention, in flowchart form.
Figure 4B:
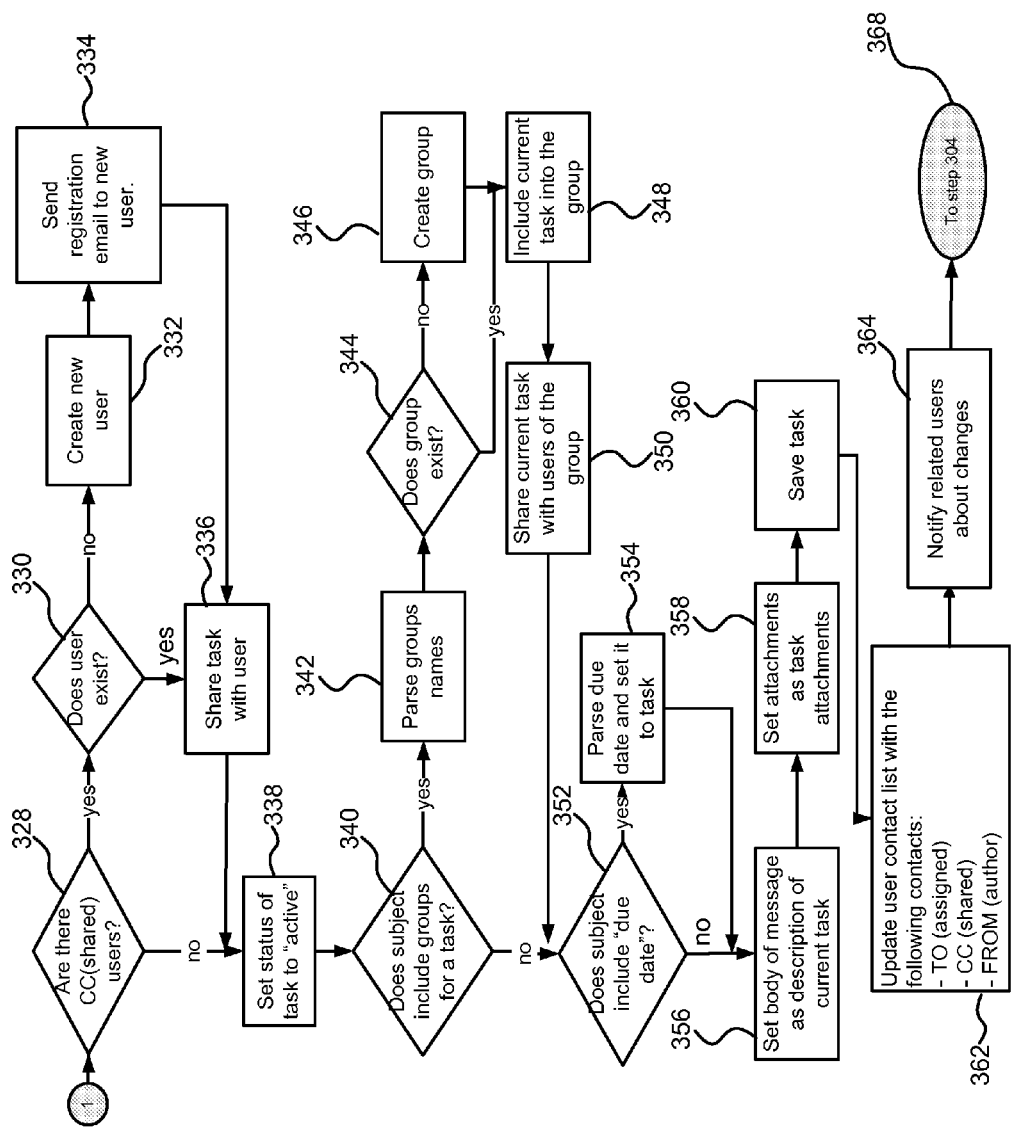

FIGS. 4A and 4B, which represent a single FIGURE, illustrate a particular implementation of the process flow in one embodiment of the invention. It should be noted that some actions in the particular implementation of this algorithm may be arranged differently or be executed in parallel. The process flow may include additional elements, or some elements may be omitted.

As shown in FIG. 4A, once the process starts in step 302, the process then checks for any incoming e-mail messages to wrike@wrike.com, in step 304. In step 306, if no new e-mail message has been received, then the algorithm cycles back to step 304. It should be noted that "pull" way of receiving a message is just a particular example of the embodiment of the invention. "Push" technologies might be used as well. If, in step 306, a new e-mail message has been received, then, in step 308, the message is read and parsed to identify the "from" field (authors), the "to" field (users to whom the task will assigned), "cc" field (users with whom the task will be shared), the subject and other required fields from the header of the e-mail, body, and attachments, etc. JavaMail or any other software library with appropriate API may be used to perform basic operations with e-mails.

In step 310, the algorithm checks if there is an existing user in the database 108 who [user] has an e-mail address associated with him that [address] equals to the e-mail address in the "from" field of the parsed e-mail. If the user does not exist in the database 108, then, in step 312, a new user is created that represents the e-mail sender in the database 108. Hibernate and JDBC or any other software packages with appropriate API may be used to perform basic database operations.

In step 314, a welcome e-mail is sent to the new user with a login and password. It should be noted that the system may be implemented differently. For example, if users do not exist in this and later cases, the task might simply be not created. As another example, the task may be created without the association with existing system user.

The new task is then created and associated with the sender as the author of the task, in step 316. If, in step 310, the sender of the e-mail already exists in the database 108, then the process proceeds directly to step 316, to create the new task.

In step 318, the algorithm checks if there are entries in the "to" field of the parsed e-mail. If there are, in step 320 the algorithm checks for every e-mail address entry in the "to" field if there is an existing user in the database 108 who [user] has an e-mail address associated with him that [address] equals to the e-mail address in the "to" field of the parsed e-mail. If this particular e-mail address does not have such corresponding user in the database 108, then, in step 322, a new user with this e-mail address is created in the database 108. In step 324, a welcome e-mail is sent to the new user with a login and password.

The algorithm then proceeds to step 326 and "assigns" task to the user/s in the "to" field. The "assigned" people can view and/or modify task, for example, set its status to "complete". The task management system can also provide additional benefits to users from knowing who is assigned to do what. For example, it can send daily reminders or allow requesting status updates.

If, in step 320, all users in "to" field of the e-mail already exist in the database 108, then the process proceeds directly to step 326 and "assigns" task to the user/s in the "to" field.

In step 328, the algorithm checks if there are entries in the "cc" field of the parsed e-mail. If there are, in step 330 the algorithm checks for every e-mail address entry in the "cc" field if there is an existing user in the database 108 who [user] has an e-mail address associated with him that [address] equals to the e-mail address in the "cc" field of the parsed e-mail. If this particular e-mail address does not have such corresponding user in the database 108, then, in step 332, a new user with this e-mail is created in the database 108. In step 334, a welcome e-mail is sent to the new user with a login and password. The algorithm then proceeds to step 336 and "shares" task to the user/s in the "cc" field. The people in "cc" field can view and/or modify task, for example, set its status to "complete". If, in step 330, all users in "cc" field of the e-mail already exist in the database 108, then the process proceeds directly to step 336 and "shares" task to the user/s in the "cc" field.

The task status is then set to "active" in step 338.

In step 340, the algorithm checks whether the subject of the e-mail includes any names of groups for a task to include in. If there are, then, in step 342, the group names are parsed. In step 344, if the group does not exist, then, in step 346, the group is created. In step 348, the current task is included in the group. In step 344, if the group does exist, then the algorithm proceeds directly to step 348. In step 350, the current task is shared with users of the group. If, in step 340, the subject of the e-mail does not include any groups, then the process proceeds directly to step 352.

The algorithm checks, in step 352, if the subject of the e-mail includes a due date. If it does, then, in step 354, the due date is parsed, and is recorded as a task parameter. If in step 352, the subject of the e-mail does not include a due date, then, the algorithm proceeds directly to step 356.

In step 356, the body of the e-mail is parsed and then used as the description of the current task. In step 358, the e-mail attachments are attached to the task. In step 360, the task is saved.

In optional step 362, contact list or users associated with the task might be updated. For example, each user might have a contacts list. In the contacts list there all users with whom this particular user interacts. If the system receives e-mail from User A's e-mail address with User B's e-mail address in "to" or "cc" field, and these users did not interact before, then User B will be added to contacts list of User A, and User A will be added to the contacts of User B. In this way, users can update their social networks by simply sending an e-mail to the system.

In step 364, the web clients of all related users are updated. E-mail notifications are also sent to users associated with the groups in which the task is included. The process then returns to step 304.

As an example of steps 340-354 consider the situation when the system received an e-mail with the subject that includes information: "[Marketing; Design] prepare documentation [2006-11-22]". In this example, the system extracts the task "prepare documentation" and includes the task in "Marketing" and "Design" groups and sets the due date of the task to "2006-11-22".

Figure 4C:
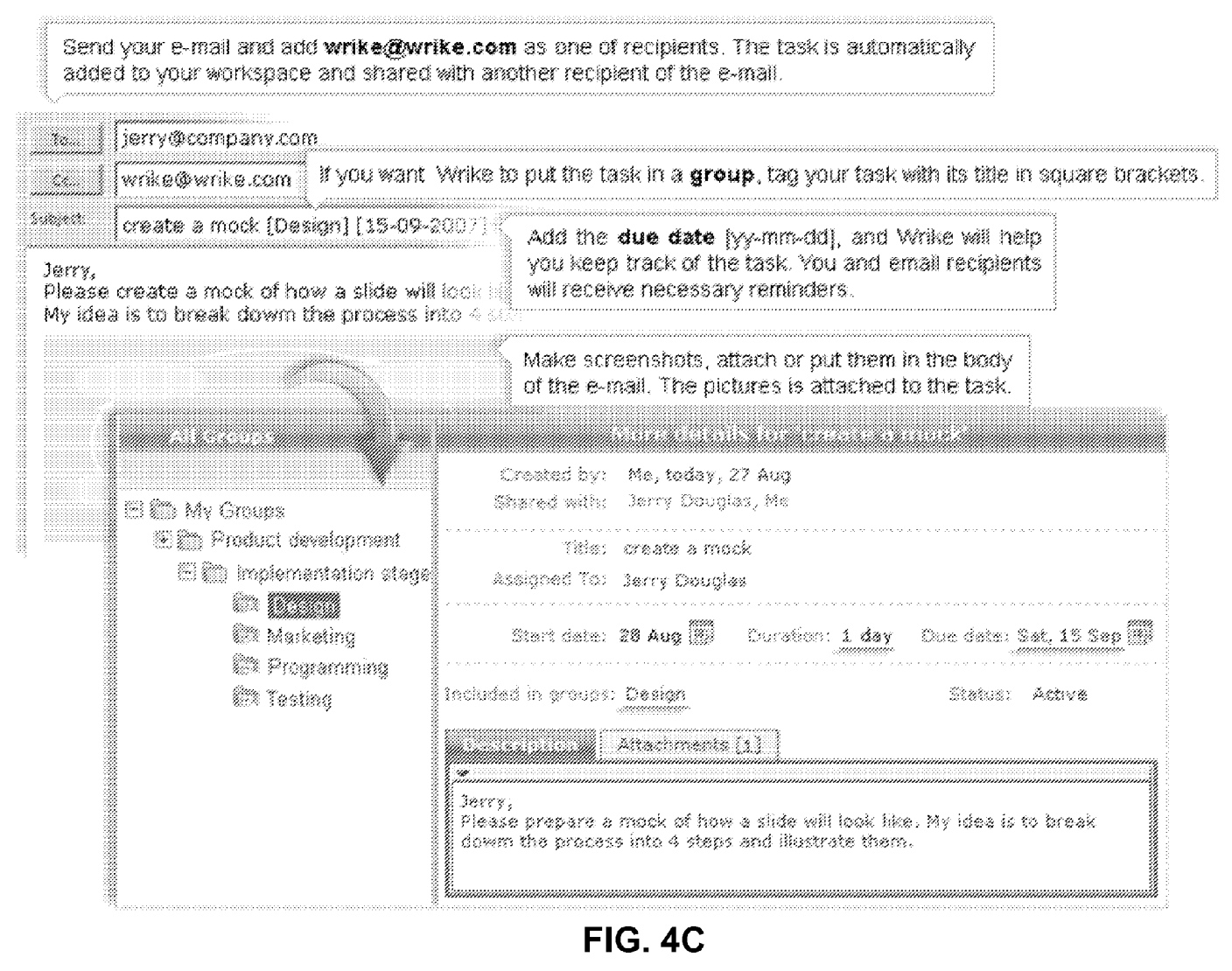

FIG. 4C illustrates the relationship among fields of an e-mail sent to the system and a new task created in the system. In this particular example, a user sent an e-mail to another person, Jerry Douglas (jerry@company.com), and included system's e-mail address, wrike@wrike.com, in "cc" field. Name and e-mail address is taken for sample (we know neither Jerry Doug, nor the person behind jerry@company.com account). The task was automatically added to the database 108 and sender and recipient got an access to this task. This task became assigned to Jerry Douglas because his e-mail address jerry@company.com was included in "cc" field of the e-mail. From the "subject" field the system extracted the name of the task, group title, and due date in this particular example. The system extracted information from the body of the e-mail and made that information a description of the task. Attachments of the e-mail became the attachments of the task.

Figure 5A:
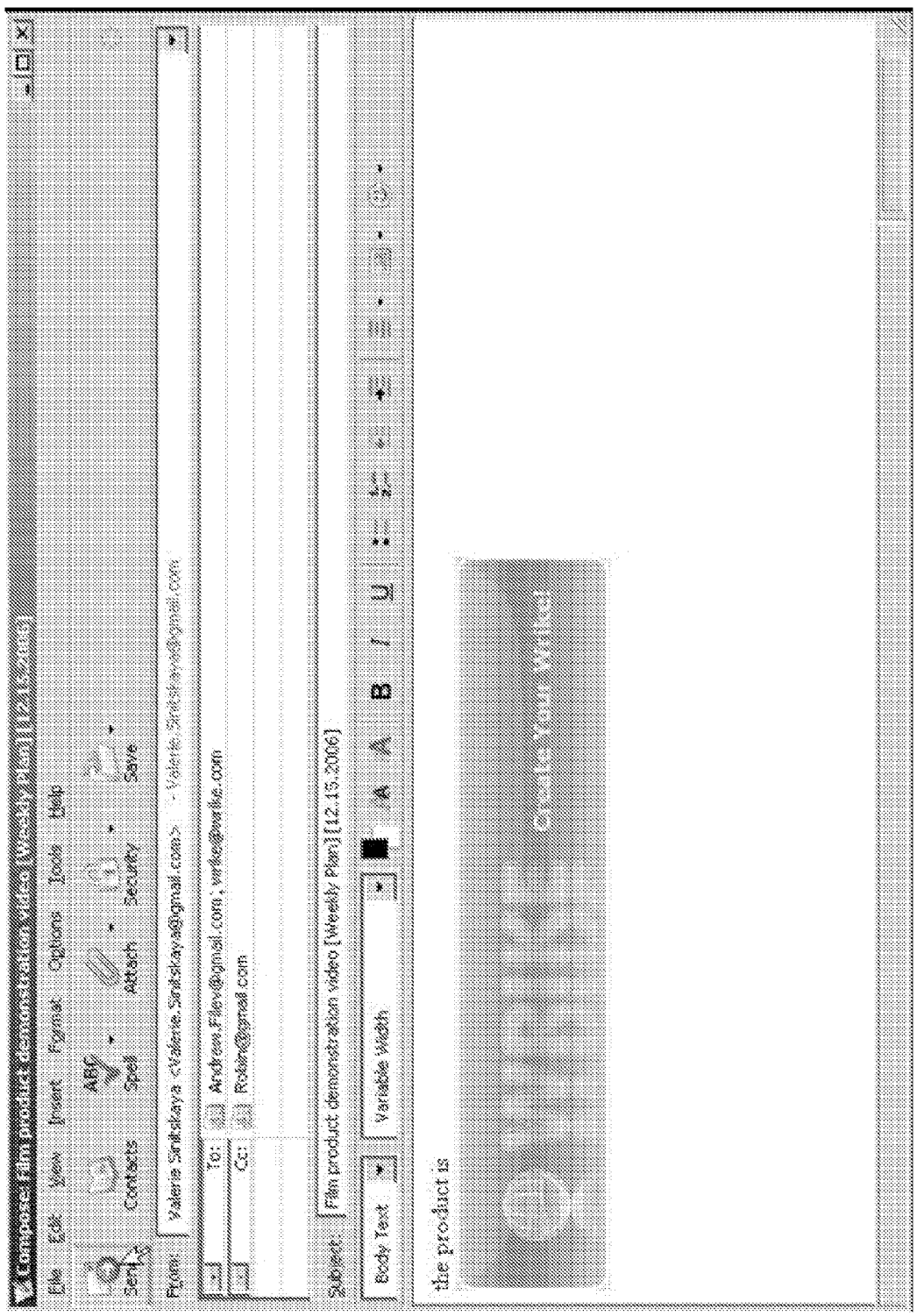
Figure 5B:
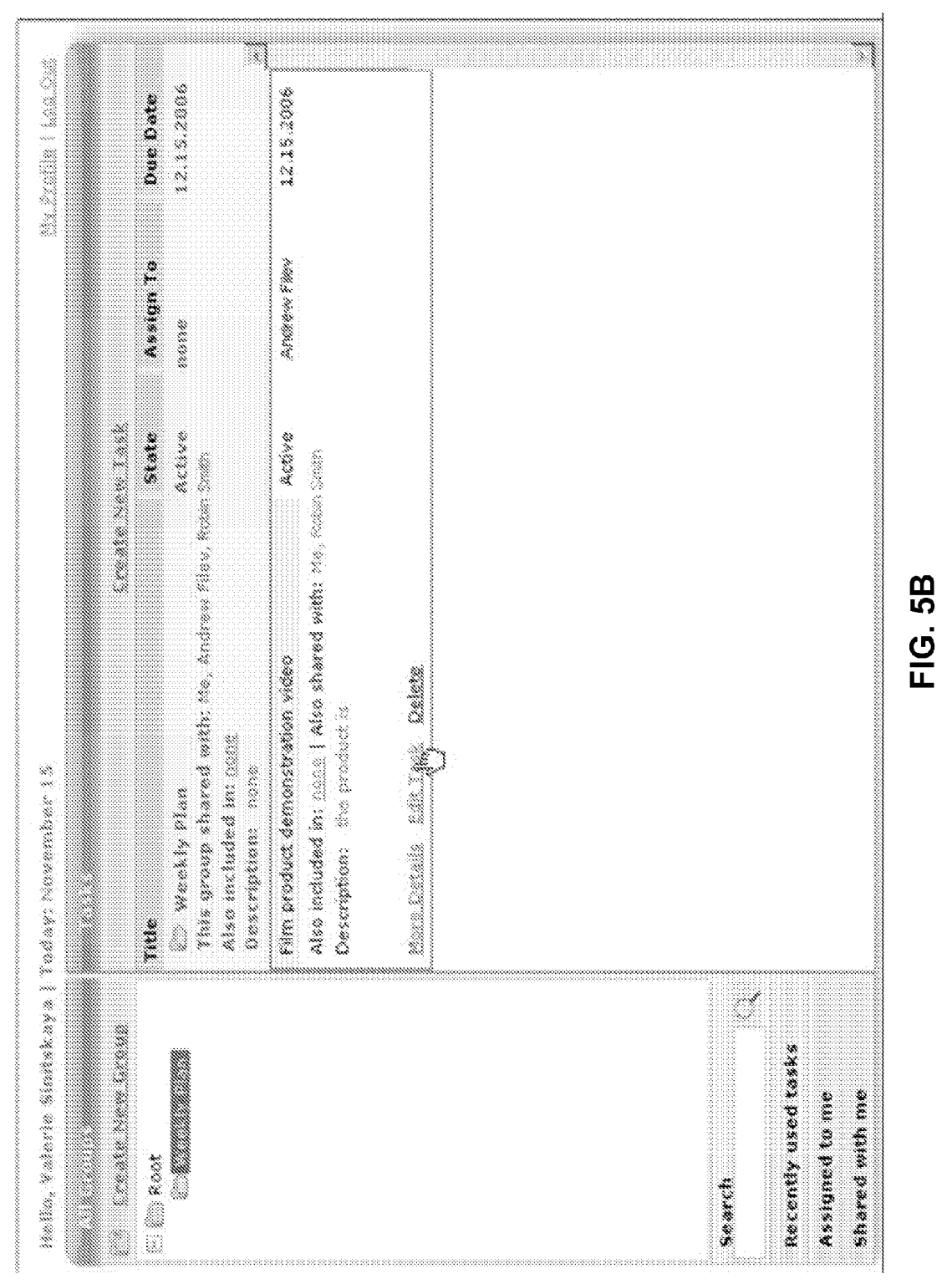
Figure 5C:
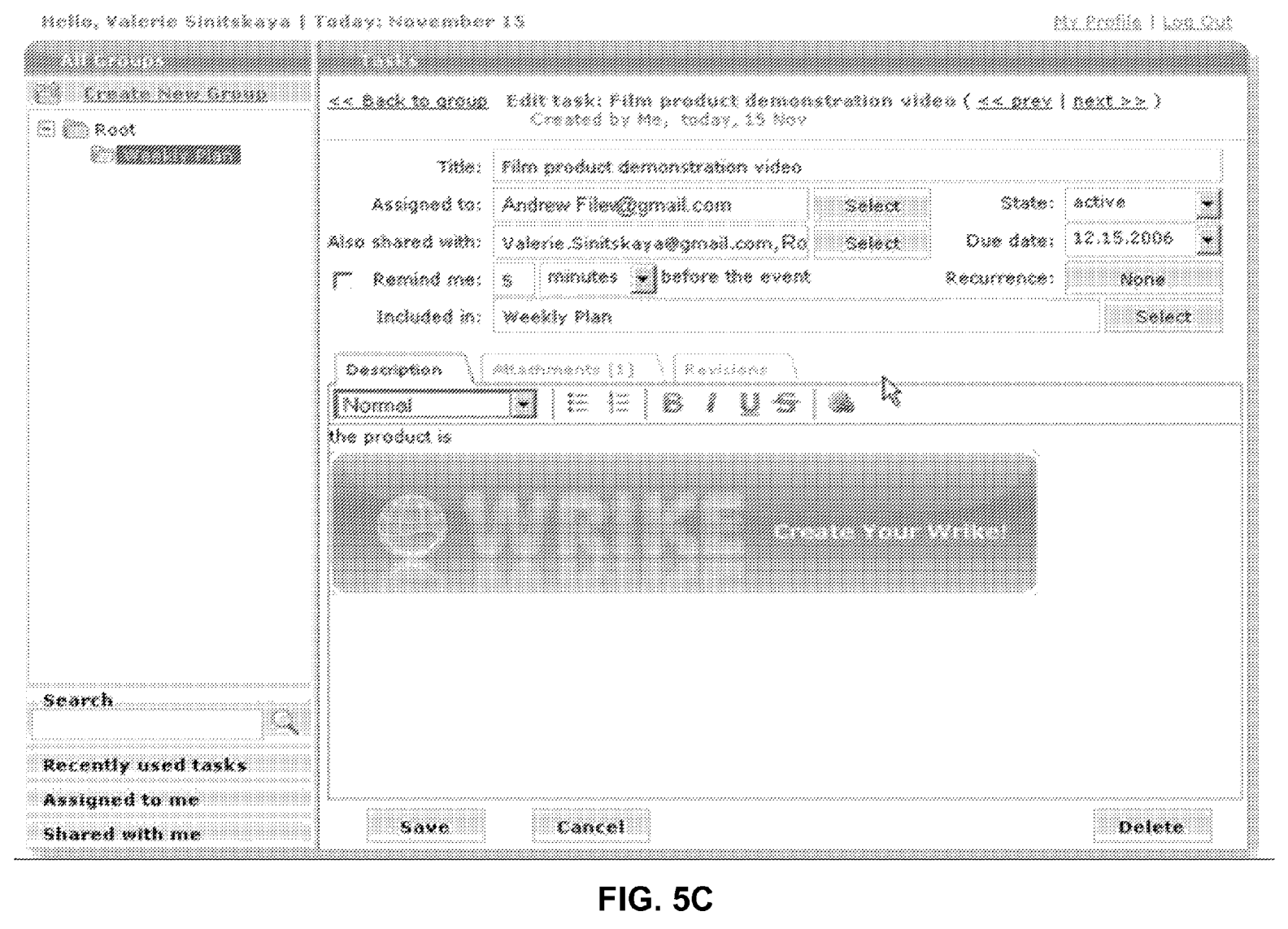
Figure 6A:
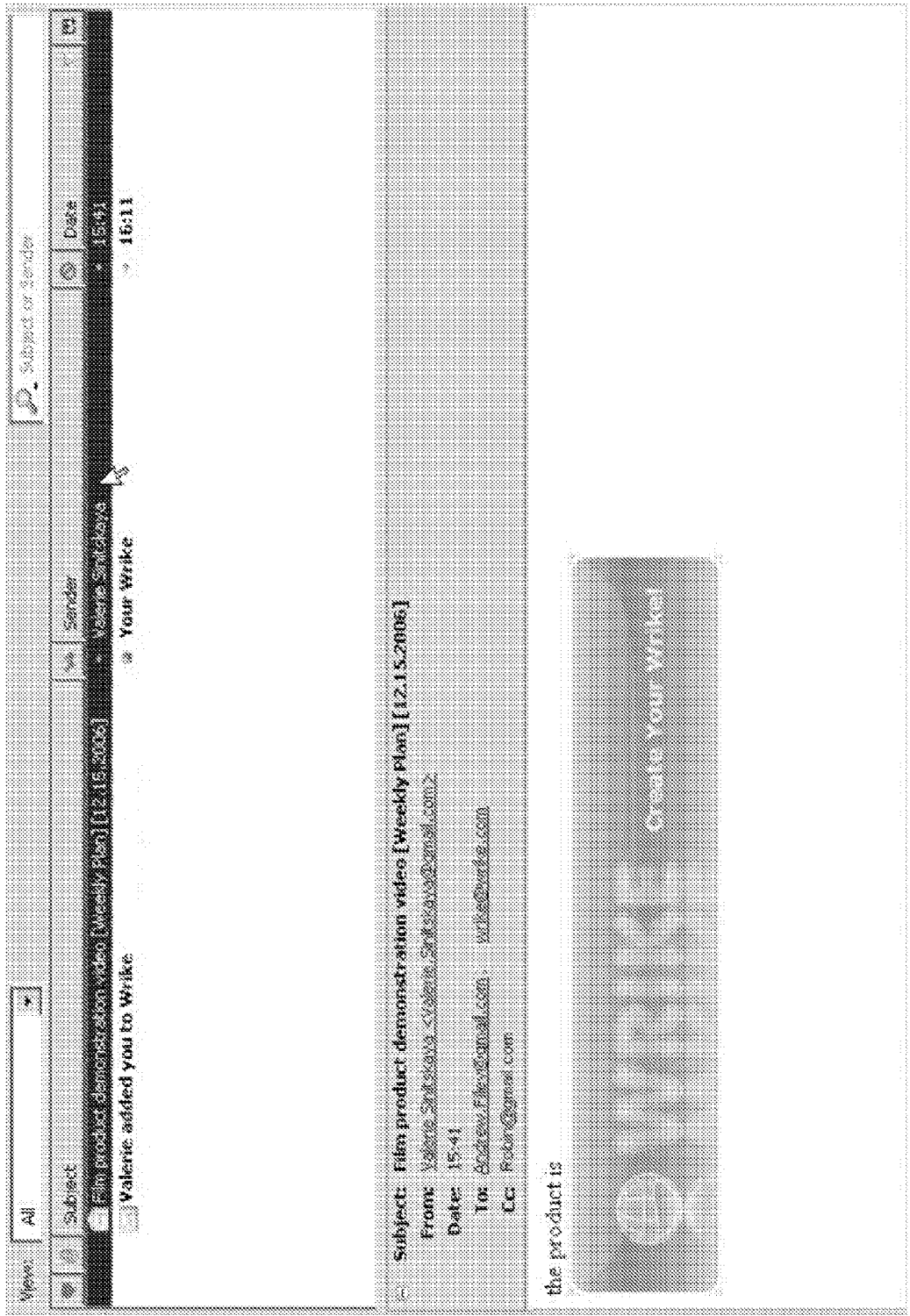
Figure 6B:
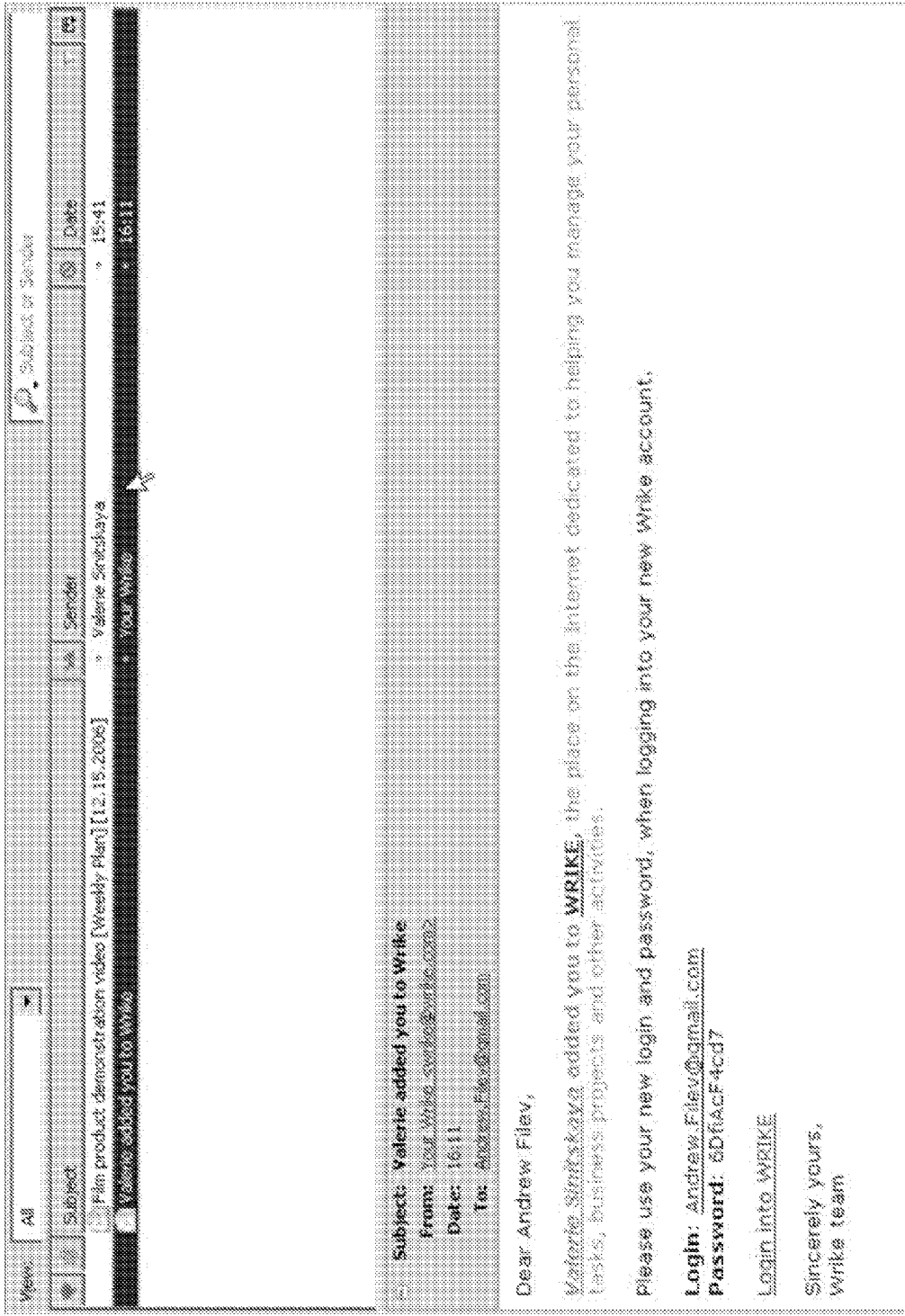

FIGS. 5A-7C illustrate screen shots, of an exemplary appearance that users see, as part of their e-mail and web interface. FIG. 5A illustrates the process of creating new task in the WRIKE system by e-mail and assigning this task to a user. User V (Valerie Sinitskaya, Valerie.Sinitskaya@gmail.com) is writing e-mail to User A (Andrew Filev, Andrew.Filev@gmail.com) and User R (Robin Smith, robin@gmail.com). Name and e-mail addresses are taken for sample (we know neither Robin Smith, nor the person behind robin@gmail.com account). User V includes wrike@wrike.com into recipients by putting this e-mail in "to" field. (She has an option to put wrike@wrike.com e-mail address in "to", "cc", or "bcc" fields.) The system obtains the e-mail from User V and extracts the task. FIGS. 5B and 5C illustrate an example of web interface, how it may look when User V logs into the web site. As you can see the task is assigned to User A and shared between User A, User R and User V. FIG. 6A illustrates an e-mail client of user A. User A obtains e-mail from User V. FIG. 6B illustrates an e-mail notification from the system in the e-mail client of User A. User A obtains e-mail from wrike.com that he was registered in the system. System credentials are included in the e-mail.

Figure 6C:
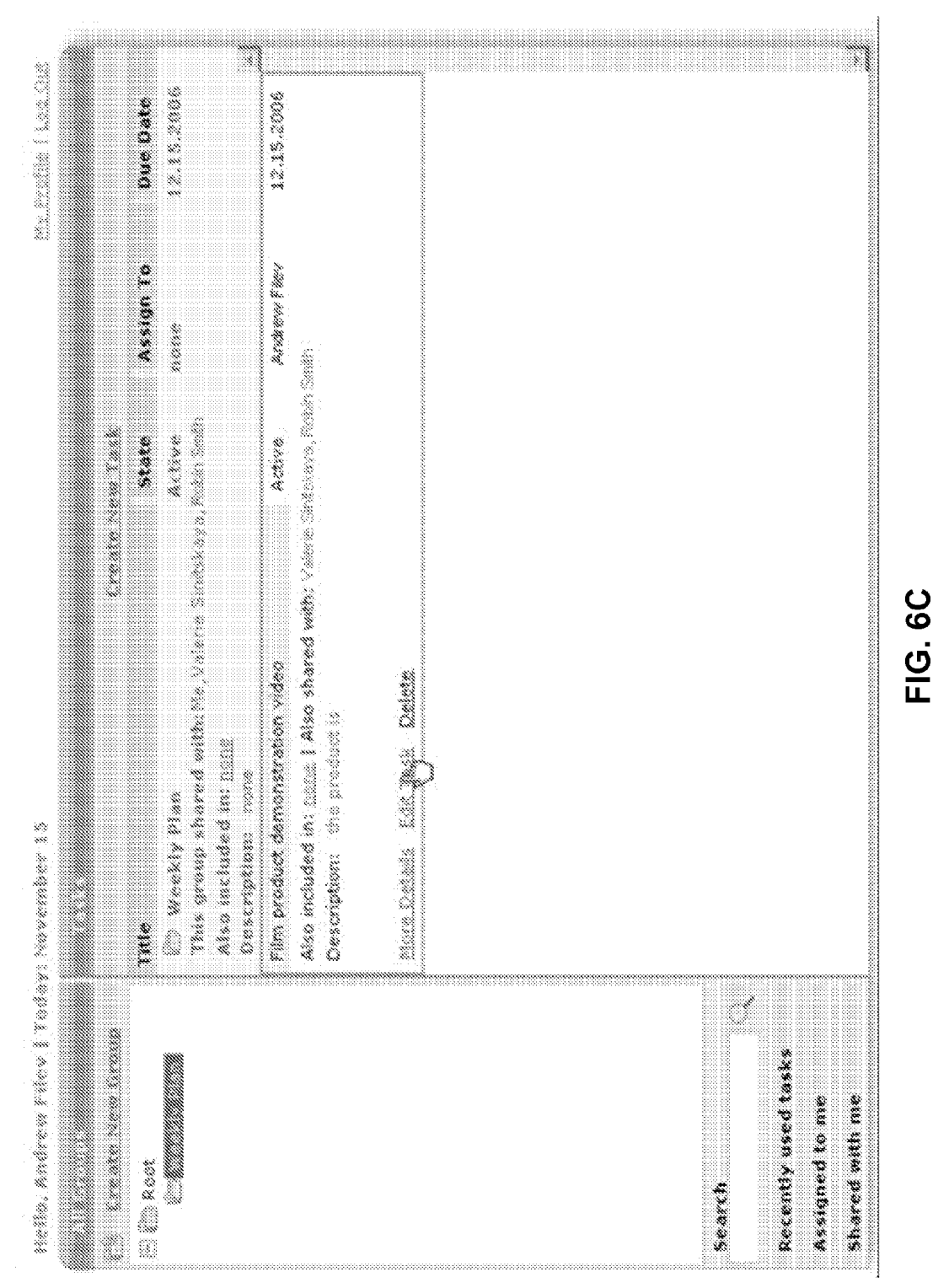
Figure 6D:
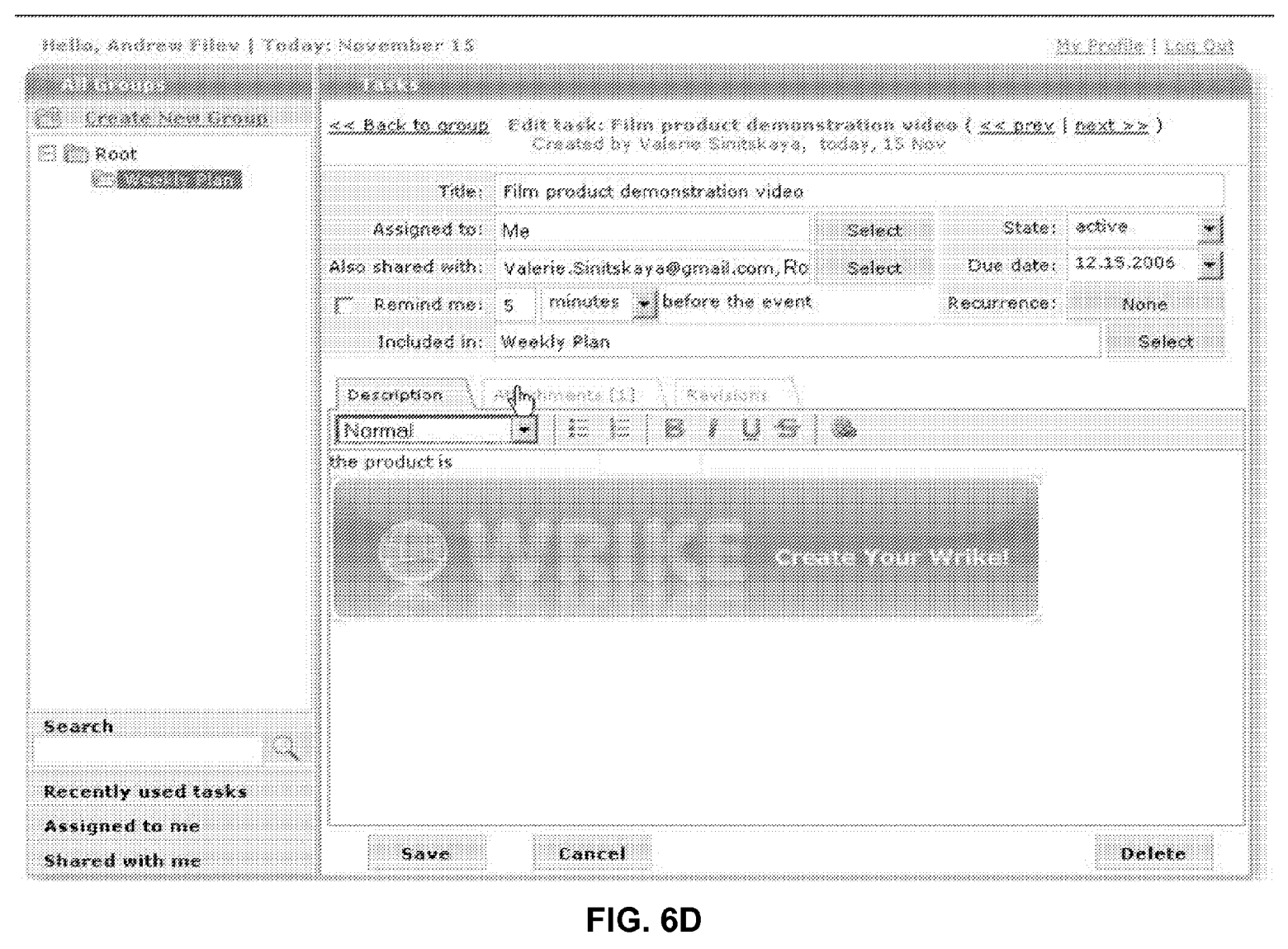
Figure 7A:
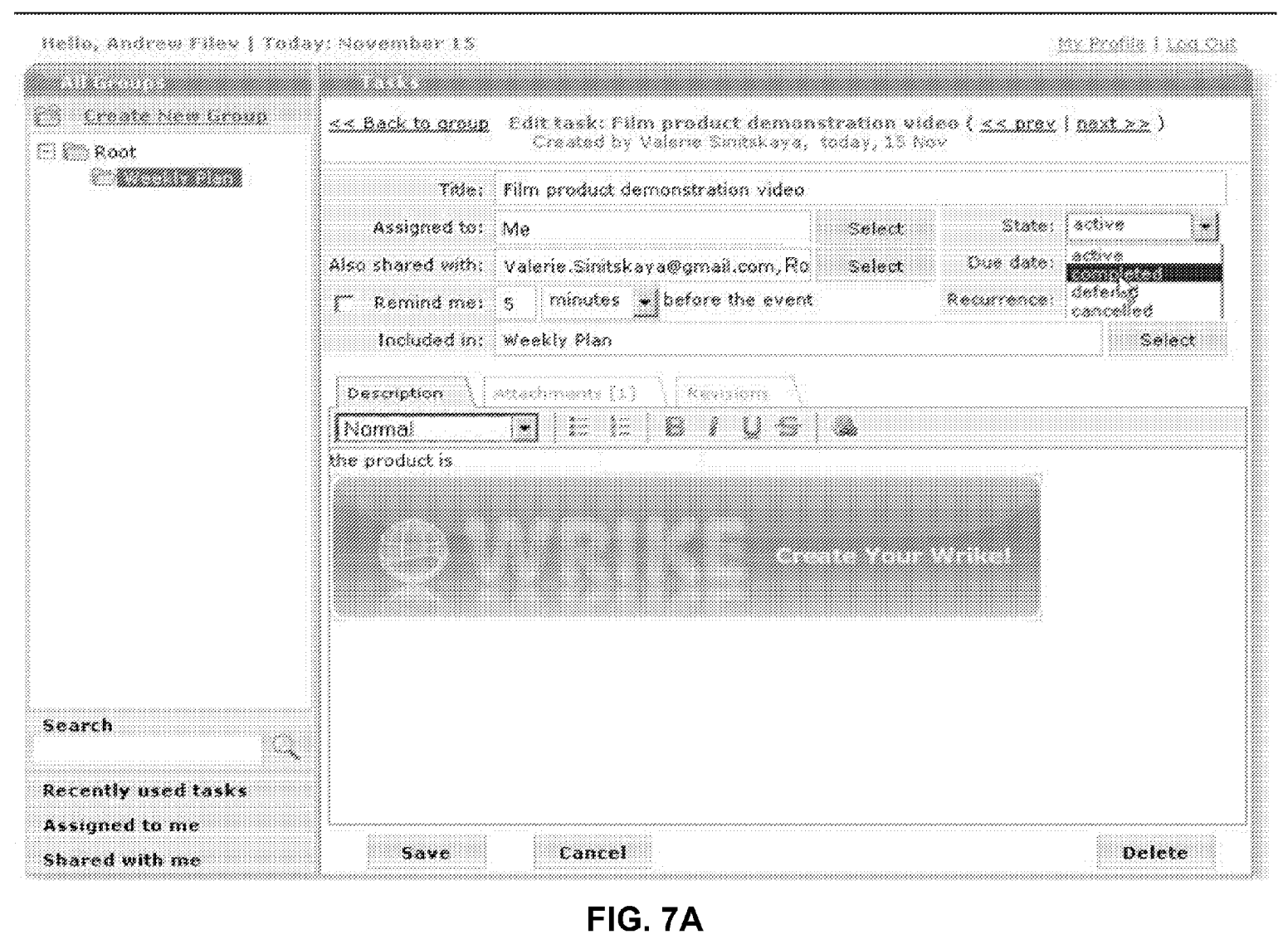
Figure 7B:
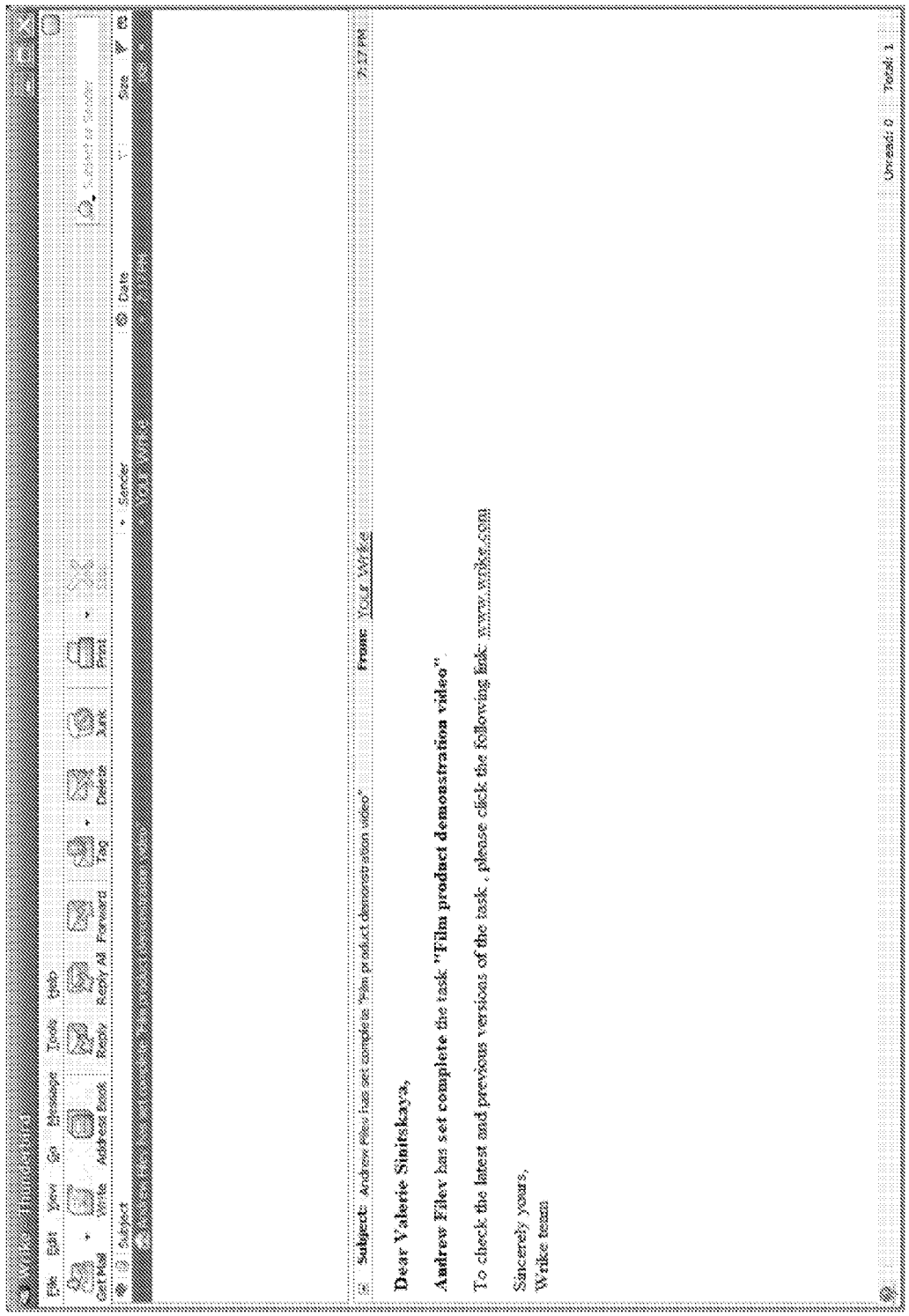

FIG. 6C and FIG. 6D illustrate an example of web interface of User A. The task is assigned to User A. FIG. 7A illustrates editing the task. User A changed the task, and set the state of task to "completed." FIG. 7B illustrates an e-mail notification from the system to a user. User V obtains e-mail from wrike.com that the task has been completed by User A. User R gets a similar notification.

Figure 8:
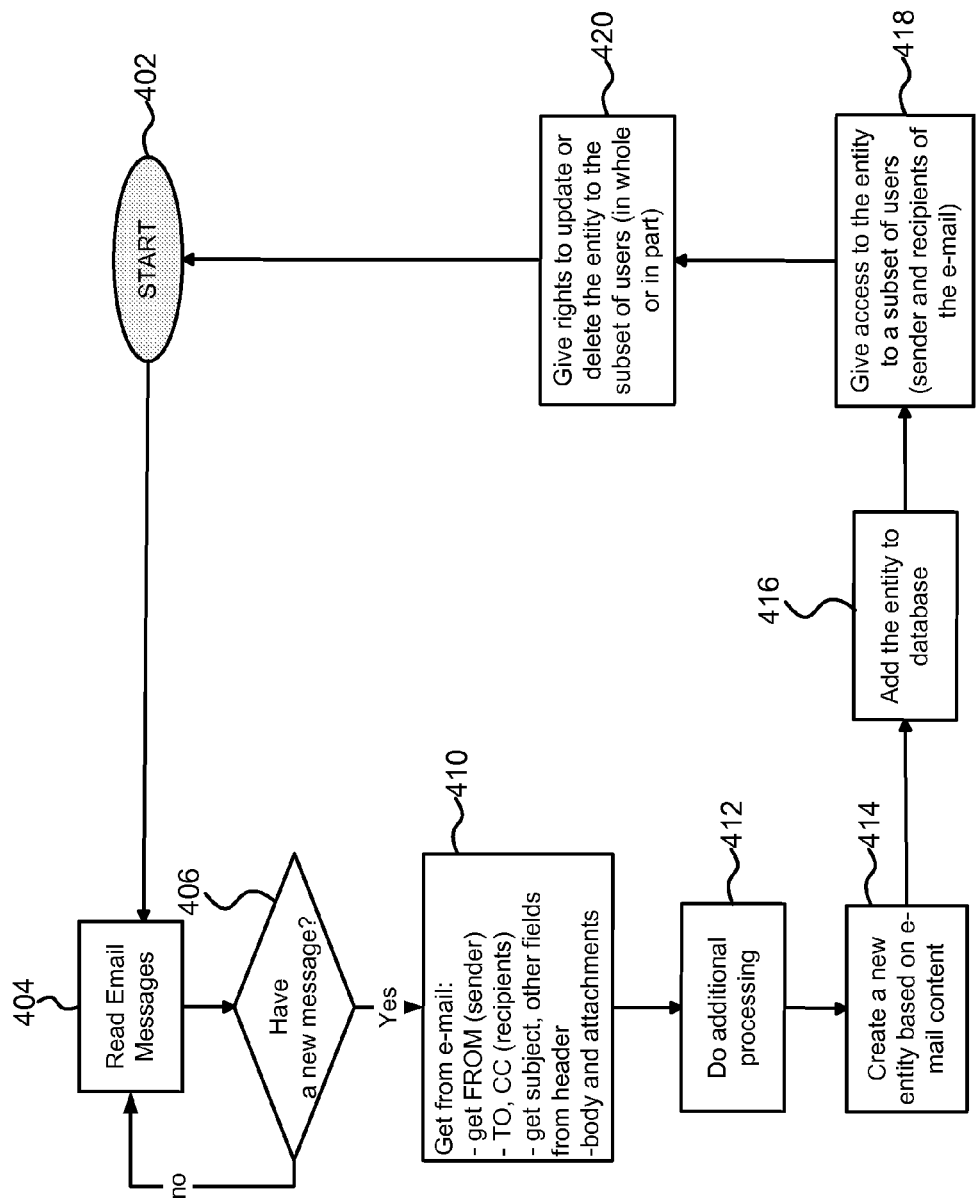
FIG. 8 illustrates exemplary applicability of the invention to online collaboration systems.

FIG. 8 illustrates the applicability of the invention to an entity sharing and collaboration system (the entity can be of a different type, such as a task, an itinerary, an online-document, picture, video, etc.). FIG. 8 is a generalized view of FIGS. 4A and 4B. The concepts illustrated in FIGS. 4A-4B can be applied to entity sharing and collaboration system, and/or can be combined with the concept of entity sharing. As shown in FIG. 8, once the system starts, in step 402, the system reads e-mail messages received at a system's e-mail address (step 404). This system's e-mail address does not vary from user to user or from entity to entity within a particular type of entity. There can be one system e-mail address that serves the whole system, or there can be different system's e-mail address for different types of entities. As an example, task@wrike.com can create a task; spreadsheet@wrike.com can create a spreadsheet; text@wrike.com can create a text document.

If no new messages are received, in step 406, the system cycles back to step 404. If a new message is received, the system, in step 410, analyzes the message content for the sender information, recipients information, parses the subject and other required fields of the e-mail, the body of the e-mail, and the attachments, etc. In step 412, the system does additional processing, for example, registering users previously unknown to the system. In step 414, a new entity is created based on the e-mail content. In step 416, the entity is added to the database 108. In step 418, access is given to a subset of users of the system (the sender and the recipients, who can now view this entity). In step 420, right to update or delete the entity is given to a subset of users of the system (in whole or in part). The update can include actions specific to the type of the entity. The process can then terminate, or can return back to the start step, 402.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A server-based system for managing tasks, the system comprising:

a. a hardware server that maintains multiple workspaces having varying access rights, wherein at least some of the unrelated workspaces have the same names;
b. the server also maintaining multiple tasks in the workspaces having varying access rights for different users;
c. the server configured to receive an e-mail from any user, the e-mail including the system's global e-mail address as one of recipients in "to", "cc", or "bcc" field;
d. the server, based on the email address of the sender, configured to find workspaces and tasks to which the sender has access;
e. the server, based on the subject of the email or body of the email, configured to identify workspaces by its non-unique name;
f. the server configured to add a task to a workspace that satisfies both (d) and (e);
g. the server configured to control access to the task based on access rights to the workspace and based on the data from the email by permitting access to the task by a subset of users of the system; and
h. the server configured to enable collaboration on the task by the subset of users.

2. The system of claim 1, wherein the subset depends on a sender and recipient/s of the e-mail.

3. The system of claim 1, wherein an author of the e-mail has access to the task.

4. The system of claim 1, wherein the task is assigned to a person or a group of people whose e-mail addresses are included in the "to" field of the e-mail.

5. The system of claim 1, wherein a person or a group of people whose e-mail addresses included in "cc" field of the e-mail have access to the task.

6. The system of claim 1, wherein the task is assigned to a person or a group of people whose e-mail addresses included in "to" field of the e-mail, and wherein a person or a group of people whose e-mail addresses included in "cc" field of the e-mail have access to the task.

7. The system of claim 1, wherein the subset of users (in whole or in part) has rights to update and delete the task, where the update includes any of setting the task complete, rescheduling the task due date and doing other modifications.

8. The system of claim 1, wherein the system's address does not vary from user to user or from task to task.

9. The system of claim 1, further comprising verifying that a sender of the email is in the server's database, and adding the sender to the server's database if the user is not already in the database.

10. The system of claim 1, further comprising verifying that all the recipients of the email are in the server's database, and adding any recipients are not already in the server's database to the server's database.

11. A server-based method for collaboration on an online document, the method comprising:
a. at a hardware server, maintaining multiple workspaces having varying access rights, wherein at least some of the unrelated workspaces have the same names;
b. at the server, maintaining multiple online documents in the workspaces having varying access rights for different users;
c. at the server, receiving an e-mail from a user, the e-mail including the system's global e-mail address as one of recipients in "to", "cc", or "bcc" field;
d. at the server, based on the email address of the sender, finding workspaces and documents to which the sender has access;
e. at the server, based on the subject of the email or body of the email, identifying workspaces by its non-unique name;
f. at the server, adding a document to a workspace that satisfies both (d) and (e);
g. based on access rights to the identified workspace and based on the data from the parsed email, controlling access to the online-document by permitting access to the online document by a subset of users of the system; and
h. enabling collaboration on the online-document by the subset of users.

12. The method of claim 11, wherein the online-document is any of a spreadsheet, text document, rich text document, web page, wiki page, blog entry or other entity.

13. The method of claim 11, wherein subset depends on sender and recipients of the e-mail.

14. The method of claim 11, wherein the e-mail address does not vary from user to user or from online-document to online-document within a particular type of online-document.

15. The method of claim 11, wherein the subset of users (in whole or in part) has rights to update or delete the online-document, where the update includes actions specific to the type of online-document.

16. A server-based method for creating a new entity, the method comprising:
a. at a hardware server, maintaining multiple workspaces having varying access rights, wherein at least some of the unrelated workspaces have the same names;
b. at the server, maintaining multiple entities in the workspaces having varying access rights for different users;
c. at the server, receiving an e-mail from any user, the e-mail includes system's global e-mail address as one of recipients in "to", "cc", or "bcc" field, wherein the e-mail address does not vary from user to user or from entity to entity within a particular type of entity;
d. at the server, based on the email address of the sender, finding workspaces and entities to which the sender has access;
e. at the server, based on the subject of the email or body of the email, identifying workspaces by its non-unique name;
f. associating the entity with an identified workspace that satisfies both criteria;
g. based on access rights to the identified workspace and based on the data from the parsed email, controlling access to the entity by permitting access to the entity by a subset of users of the system; and
h. enabling collaboration on the entity by the subset of users.

17. The method of claim 16, wherein the subset of users (in whole or in part) has rights to update or delete the entity, and wherein the update includes actions specific to the type of entity.

18. The method of claim 16, wherein the entity is any of a task, an online document, itinerary, pictures, and videos.

* * * * *